United States Patent [19]

Wunderlin et al.

[11] 4,242,568
[45] Dec. 30, 1980

[54] APPARATUS FOR THE SELECTIVE PRODUCTION OF HOT WATER AND STEAM

[75] Inventors: Max Wunderlin; Peter Gurtner, both of Jona, Switzerland

[73] Assignee: Turmix AG, Jona, Switzerland

[21] Appl. No.: 27,751

[22] Filed: Apr. 6, 1979

[30] Foreign Application Priority Data

Apr. 10, 1978 [CH] Switzerland .......................... 3810/78

[51] Int. Cl.³ .......................... H05B 1/00; F24H 1/10
[52] U.S. Cl. ..................................... 219/296; 219/297; 219/302; 219/303; 222/146 HE; 99/280; 137/341
[58] Field of Search ............... 219/296, 297, 302, 323, 219/303, 306, 310, 380, 311, 330, 304, 431, 440; 222/67, 146 HE; 99/280, 282; 137/341

[56] References Cited

U.S. PATENT DOCUMENTS

| 2,819,377 | 1/1958 | Brown ............... 219/296 X |
| 3,200,997 | 8/1965 | Creswick ............ 222/146 HE |
| 3,200,999 | 8/1965 | Price, Jr. ............... 222/185 |
| 3,523,178 | 8/1970 | Spensley et al. ........... 219/330 |
| 3,912,906 | 10/1975 | McIntosh et al. ........... 219/296 X |
| 3,976,229 | 8/1976 | Jackson .............. 222/146 HE |
| 4,017,006 | 4/1977 | Wilder ............... 219/296 X |
| 4,138,936 | 2/1979 | Williams ............... 99/282 |
| 4,165,681 | 8/1979 | Belinkoff .............. 99/280 |

Primary Examiner—Volodymyr Y. Mayewsky
Attorney, Agent, or Firm—Watson, Cole, Grindle & Watson

[57] ABSTRACT

A process and apparatus is provided for the selective production of hot water and steam from a constantly operating heater and with the use of a water pump intermittently feeding a constant volume of water through a conduit toward the heater, the pump and the heater being operable at a first rate of pumping frequency and at a first level of temperature for the production of hot water at a first operating condition. A control arrangement is provided for establishing a second rate of pumping frequency at the pump less than the first rate and a second level of temperature at the heater greater than the first level for the production of steam at a second operating condition. Control switches permit switching from one operating condition to another, and a steam collector used in the production of the steam includes an actuator for the switches so that the operating conditions are switched from one to the other upon insertion of the steam collector into and removal from a support for the collector beneath an exit opening of the conduit.

7 Claims, 3 Drawing Figures

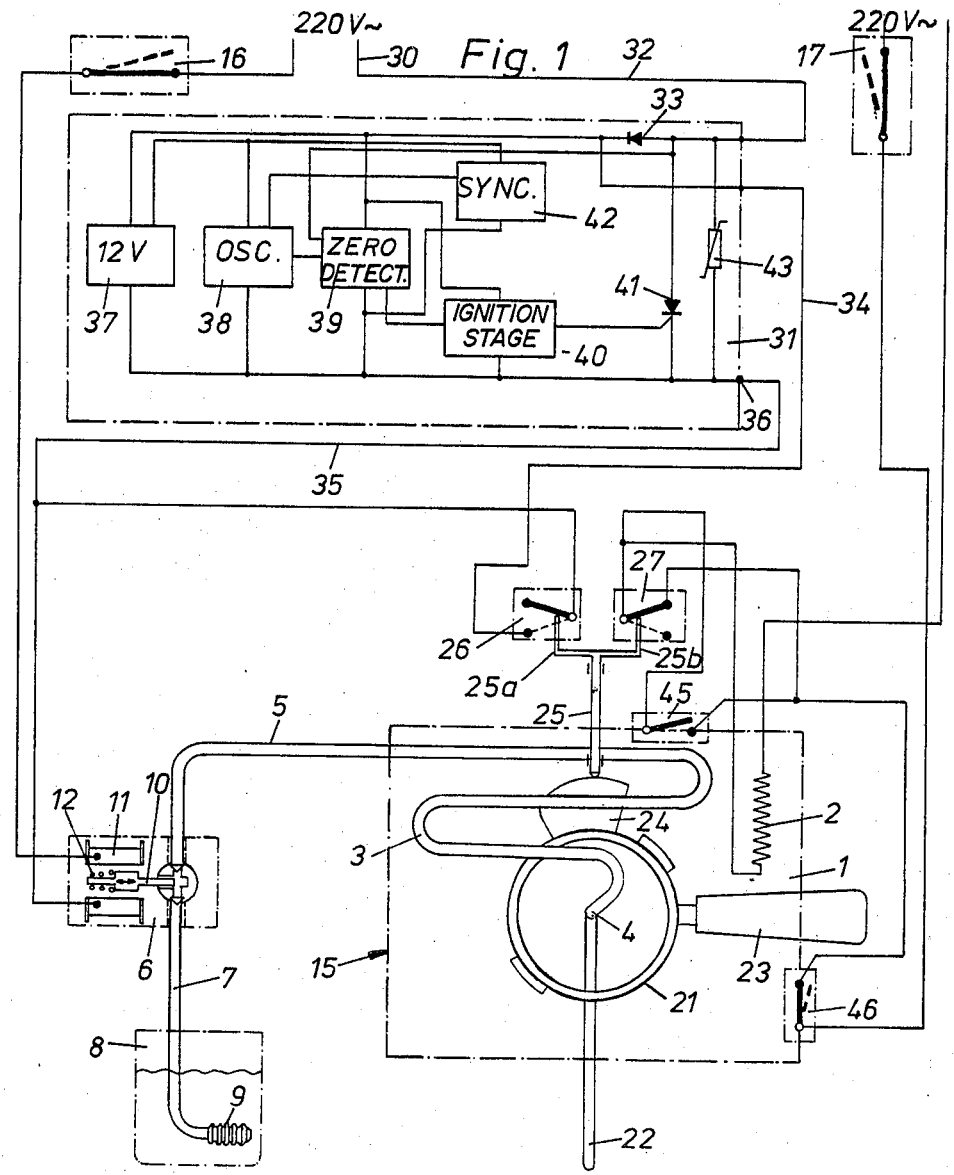
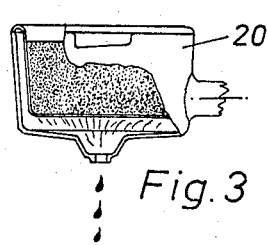
Fig. 3
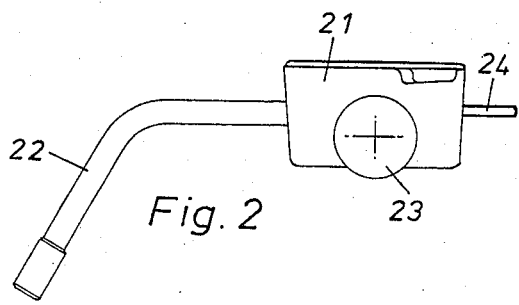
Fig. 2

APPARATUS FOR THE SELECTIVE PRODUCTION OF HOT WATER AND STEAM

BACKGROUND OF THE INVENTION

This invention relates generally to a process and apparatus for the selective production of hot water and steam from a volume of water pumped toward a constantly operating heater. More particularly, the process and apparatus of the invention include an actuator on a steam collector used for the production of steam suitable for the heating of drinks. Insertion of the steam collector into the apparatus causes a decrease in pumping frequency and a temperature level increase in the heater.

Espresso coffee machines normally permit water to be heated to about 96° C. and forced at a suitable pressure through the ground coffee in order to obtain an extract known as espresso coffee. Machines of this type normally have a water tank, an electrically heated constantly operated heater, and a pressure pump located between the tank and heater for pumping the super heated water through a conduit toward the heater. The pump may be of a swing-lever type, for example, wherein a lifting member thereof is magnetically shifted forward and returned under the action of a spring for effectively pressurizing the heated water.

Coffee machines of this type have also been provided with a steam producing capability for the heating of drinks so as to, for example, heat milk by passing a jet of steam therethrough. Thus, a strainer holder normally provided for the brewing of the coffee is interchangeable with some type of steam collector when steam is to be produced.

For the production of steam, a much smaller volume of water per unit of time must be pumped toward the heater for heating the water so that the water will completely evaporate in the heater to avoid any mixture of hot water and steam being collected by the steam collector. Such a mixture is undesirable since the drink to be heated would become watered down. Since the water must completely evaporate in the heater, the discharge volume of the pressure pump must be reduced. In the prior art machines, this reduction of discharge volume of the pump has been achieved by shortening the stroke of the pump which, if operating with AC current, may be carried out by shift control. However, with the pump operating at such short strokes it has been difficult to precisely regulate complete evaporation of the conveyed volume of water in the heater. Thus, with the pump conveying more than the desired amount of water, steam mixed with water emerges from the machine at a time when only steam is preferred.

Moreover, drinks intended to be steam heated have been known to be also watered down by hot water due to some improper manipulation of the machine by the operator even through the machine is otherwise capable of producing the desired steam. Such a faulty manipulation has been known to occur because of the steam and hot water production switches being made to operate independently of one another. Thus, whenever it is possible to operate the switch for the production of steam when a strainer containing coffee is inserted into the machine for the production of coffee, the coffee is contaminated with the steam and becomes undrinkable. On the other hand, when the switch for the production of hot water may be operated at a time when it is desired to heat a drink upon insertion of a steam collector into the machine, the drink to be heated will obviously become watered down.

SUMMARY OF THE INVENTION

It is therefore an object of the present invention to provide a process and apparatus for the selective production of hot water and steam but positively avoiding emergence from the heater of any hot water when the machine is intended to yield steam, and vice versa, so that no steam will be produced by the machine when it is intended to supply hot water for the brewing of coffee and the like.

In accordance with this general objective, the process of the invention includes the selective production of hot water and steam by intermittently supplying the constantly operating heater always with the same volume of water, and by supplying the heater with a volume of water at longer time intervals for the production of steam than for the production of hot water.

The apparatus for carrying out the process according to the invention has a pressure pump for the intermittent supply of a constantly operating heater with a volume of water, a control means being provided for shifting the pump and heater between two operating conditions permitting the pump to operate at a first operating condition wherein the pumping frequency is higher and the heater is at a lower temperature level as compared to a second operating condition wherein the pumping frequency is lower and the temperature level is higher, respectively, for the production of hot water and steam.

Further, the apparatus is developed as a coffee machine for the preparation of coffee and for the heating of drinks by means of steam, and has a water tank, an electrically heated constantly operating heater and a pressure pump on a conduit extending from the tank to the heater. The pump and the heater are operable at a first rate of pumping frequency and at a first level of temperature for the production of hot water at a first operating condition, and a control means is provided having an electric switching arrangement with a timing pulse generator, such an arrangement being series connected with the pump and an electric current supply in a second operating condition of the pump, the pump being series connected only with the supply in the first pump operating condition. The heating coil of the heater is series connected with the electric supply through a steam thermostat in the second operating condition, and is series connected with the supply through a coffee thermostat in the first operating condition. The operating conditions may be switched from one to the other by a steam collector having a switch actuator thereon. Thus, the pumping frequency of the pump during both operating conditions is changeable without altering the constant volume capability of the pump. The constantly operating heater is also switched into a higher temperature level by the actuator on the steam collector so that only steam will be produced when intended, and will not be mixed with any hot water since it will have been completely evaporated.

Further in accordance with the present apparatus, the switching from one operating condition to another is effected by a pair of switches, one for the pump and the other for the heater, which are simultaneously operated upon insertion of the steam collector into the machine for both reducing the pumping frequency and at the same time increasing the temperature level at the second operating condition for the production of steam.

When the steam collector is removed from the machine, and a coffee strainer holder which has no switch actuator is inserted into the machine, the switches permit the pump and heater to return to the first operating condition for the production of hot water. The steam collector may be in the form of an open cup-shaped element having a steam exit tube mounted thereon as well as a control cam serving as the actuating means. The control cam bears against a forked transfer member which simultaneously engages both switches at the time the steam collector is inserted into the machine.

BRIEF DESCRIPTION OF THE DRAWINGS

FIG. 1 diagrammatically illustrates the apparatus according to the invention and includes a diagram showing of the electric circuit arrangement;

FIG. 2 is a side elevational view of the steam collector usable with the invention; and FIG. 3 is a side elevational view, partly broken away, of a holder for a coffee strainer usable with the invention.

DETAILED DESCRIPTION OF THE INVENTION

FIG. 1 schematically shows only that portion of the apparatus according to the invention, for example, an espresso coffee machine, which is necessary for the selective production of hot water and steam and for the control of the work cycles in the machine. The apparatus has a thermoblock 1, blocked within a phantom outline, which is heated electrically by a heating coil 2. A serpentine or coiled water conduit section 3 is disposed within the thermoblock for the heating of the water passing through the conduit. This coiled conduit section has an outlet opening 4 for hot water or steam, the outlet being disposed centrally of the thermoblock and extending from the lower side thereof. A water conduit section 5, lying outwardly of the thermoblock, connects the coiled section with a swing-lever pump 6, and a conduit section 7 leads from this pump to a water tank 8 containing a volume of water for the selective production of hot water or for the production of steam. Below the water level in the tank the water conduit has an inlet end on which a bellows 9 is mounted which functions as an auxiliary pump for the purpose of filling pump 6 with water upon the starting of the coffee machine. For this purpose the bellows may be compressed axially while closing its terminal opening with the thumb of the operator, as in any normal manner. Pressure pump 6 has a longitudinally shiftable lifting member 10 which is magnetically moved in an axial direction by means of an electromagnetic coil 11 counter to the action of a coil spring 12. The water is pumped under pressure into the coiled section 3 of the conduit under the spring force of spring 12, as in a manner known in the art. And, thermoblock 1, together with heating coil 2 and coiled section 3 of the water conduit form a constantly operating heater 15.

The coffee machine is operated by the voltage of the electric power mains. The machine has a switch 16 for the pump 6 and a switch 17 for the heating coil 2, the switches being part of a single control arrangement although they are shown independent of one another in FIG. 1 only for the sake of clarity. Pressure pump 6 operates at a frequency of 3000 strokes per minute for the production of hot water. This frequency corresponds to the frequency of the mains current supply of 50 Hz, whereby the half waves are used by the AC current for the energization of electromagnetic coil 11 of the pump in order to move lifting member 10 counter to the action of spring 12, while the lifting member of the pump returns under the action of the spring in the period always between two half waves.

Whenever hot water is to be produced in the coffee machine in a first operating condition of the pump, a strainer holder 20 for the coffee (shown in FIG. 3) is inserted into the machine below exit opening 4 of the continuously operating heater 15, and is seated on a suitably provided holder (not shown). However, when steam is to be produced in the coffee machine in a second operating condition of the pump, this strainer holder 20 is removed from the machine and a steam collection assembly, shown in FIG. 2, is inserted into the machine below exit opening 4, as illustrated in FIG. 1. This assembly includes a cup-shaped element 21 having an open top, and a steam exit tube 22 extending outwardly of one side of element 21. A handle 23 is mounted on the cup-shaped element so that the assembly may be conveniently manipulated by the operator, and a control cam element 24 extends radially outwardly of element 21 in a direction substantially opposite that of tube 22. The steam collection assembly is shown in top plan view in FIG. 1 so that the function and operation of control cam 24 may be seen. A forked transfer member 25, having a forked end defined by prongs 25a and 25b, is disposed in the machine for axial shifting movement and lies in substantially the same horizontal plane as that of control cam 24 when the steam collection assembly is inserted into the machine. Therefore, when the steam collection assembly rests upon the suitably provided support (not shown) after the assembly is inserted into the machine, the cam edge of the control cam lies adjacent or in light contact with the free end of the transfer member and in the same horizontal plane therewith so that, upon slight counterclockwise rotation of the assembly about the vertical axis of the cup 21, the cam edge will cause transfer member 25 to be shifted in a direction away from the assembly. Switches 26 and 27, shown blocked in phantom outlines, respectively include switch plates for the pump and for the heating coil. As can be seen these switch plates are mounted in place at their inner ends for pivotal movement between their two positions respectively shown in dashed and solid outlines. The switch plates are disposed for bearing contact by prongs 25a and 25b so that, upon the aforedescribed shifting movement of the transfer member caused by the cam actuator, the plate of switch 26 is moved from its closed (dashed) position to its open (solid) position by prong 25a, and the plate of switch 27 is simultaneously moved from its open (dashed) position to its closed (solid) position by prong 25b. As will be more fully described hereinafter, this simultaneous switching changes the operation of pump 6 as well as the operation of heating coil 2.

An electric switching arrangement, generally designated 31 and shown blocked in phantom outline, is disposed between a mains connection 30 of the main supply and the pump 6, this arrangement being connected to the mains voltage supply by an electric lead line 32. The electric switching arrangement has a rectifier 33 and behind it an electric lead line 34 connectes the switching arrangement with switch 26. Thus, when the steam collection assembly is removed from the machine, i.e., when it is desired to produce hot water for the making of coffee, switch 26 is returned to its closed position whereby the elecric switching arrangement is by-passed so that the pressure pump operates directly from the mains supply at 3000 strokes per minute and at a frequency of 50 Hz.

When steam collection assembly 21 is inserted ino the machine as in the aforedescribed manner, switch 26 is opened (as shown in FIG. 1) so that pump 6 is now connected directly via electric lead line 35 with the exit juncture 36 of the switching arrangement. Arrangement 31 comprises a feed 37 for the current supply of a 12 volt system, as well as the rectifier 33. An oscillator 38 delivers a pulse of 30 ms every 0.6 seconds. A zero detector 39 monitors the mains voltage and delivers an impulse of about 2 ms duration to an ignition stage 40, whenever the pulse of the oscillator coincides with a zero axis crossing of the mains voltage from the negative to the positive. This ignition stage then ignites a thyristor 41 for a half wave so that pump 6 will operate one time. A synchronizer 42 synchronizes the oscillator with the mains frequency. An over-voltage protection in the form of a varistor 43 protects the electronic system from transient over-voltages. With this circuit arrangement, one hundred 50 Hz half waves per minute are produced, so that the swing-lever pump 6 operates with 100 strokes per minute for the production of steam. The number of strokes may be regulated so that too much or too little water is not moved through the water conduit, the moved volume of water thereby evaporating completely in the constantly operating heater. It should be pointed out that an electromechanical timing pulse generator could be substituted for the aforedescribed electronic timing pulse generator, without departing from the scope of the invention.

In order to assure the complete evaporation of the water moving within the conduit in the continuous heater, heating coil 2 is switched from a first level of temperature at a first operating condition of the heater for the production of hot water, to a second level of temperature higher than the first level for the production of steam, by the operation of swith 27 which is moved to its closed position of FIG. 1 simultaneously with the opening of switch 26 upon insertion of the steam collection assembly into the machine. When switch 27 is moved into its FIG. 1 position, a coffee thermostat 45 is shorted and the temperature control is then transferred to a steam thermostat 46 which is adjusted at a higher level. The heating coil may then reach a temperature of about 150° C.

From the foregoing it can be seen that the machine according to the invention will selectively produce hot water when the steam collection assembly is completely removed from the machine and a holder such as 20 is inserted beneath exit opening 4. Steam cannot now be produced, even inadvertently, since only the steam collection assembly is provided with means for actuating switches 26 and 27. Thus, in the hot water production mode of the machine, the pump is series connected directly with the mains supply, and heating coil 2 is in series with the mains supply and with the coffee thermostat 45. Thus, the pump operates at a frequency of 3000 strokes per minute and the heating coil operates at a normal predetermined level for the production of hot water. However, when the steam collection assembly is inserted into the machine, the cam actuator thereon, via transfer member 25, moves switches 26 and 27 respectively into their open and closed positions so that electric switching arrangement 31 is now in series with the pump and the mains supply, and heating coil 2 is now in series with the mains supply and the higher temperature level of steam thermostat 46. The frequency of the pump is therefore now reduced to about 100 strokes per minute, and the temperature level of the heating coil is increased above that level set by thermostat 45 so that steam may now be produced by the machine. Only steam can be produced in this manner, and not hot water since the machine cannot be mistakenly set for the production of hot water when the production of steam is intended. And, it should be pointed out that the pump is designed to feed a constant volume of water through the conduit since the length of the pump stroke remains unchanged during both the production of water and the production of steam modes of the machine. Thus, water in the conduit, when in the steam production mode, will be assured of being completely evaporated by the time it reaches exit opening 4.

Obviously, many modifications and variations of the present invention are made possible in the light of the above teachings. It is therefore to be understood that within the scope of the appended claims the invention may be practiced otherwise than as specifically described.

We claim:

1. An apparatus comprising a constantly operating electric heater and reciprocating water feed pump for intermittently supplying said heater with a volume of water through a liquid conduit for the selective production of hot water and steam, said pump being actuatable by an electromechanical driving means, the latter and said heater being operatively connected with an electric current supply for operation of said pump at a first rate of pumping frequency and said heater at a first level of temperature for the production of hot water at a first operation condition, control means connected with said electric current supply for establishing a second rate of pumping frequency at said pump less than said first rate and a second level of temperature at said heater greater than said first level for the production of steam at a second operating condition, with the pump having the same discharge volume per stroke of the pump at the first and the second operating condition, said means including switching means for switching between said operating conditions, and means for actuating said switching means for switching between said first and second operating conditions.

2. The apparatus according to claim 1, wherein the production of hot water is suitable for the brewing of coffee, and the production of steam is suitable for the heating of drinks, and further including a water supply tank, said conduit being in communication with said tank, said heater having electric heating coil means, said control means further including an electric circuit arrangement having a timing pulse generator controlable for producing a first and a second frequency for operation of said electromechanical driving means of the pump at a first rate of pumping frequency and at a second rate of pumping frequency with the pump having the same discharge volume per stroke of the pump at the first and the second pumping frequency.

3. The apparatus according to claim 1, wherein said swiching means includes a first switch movable by said actuating means from a closed to an open position for reducing said pumping frequency at said pump from said first rate to said second rate, and said switching means further includes a second switch movable by said actuating means from an open to a closed position for increasing the temperature at said heater from said first level to said second level.

4. A coffee machine for the selective production of hot water suitable for the brewing of coffee and the like, and for the production of steam suitable for the heating of drinks, comprising, a tank containing a quantity of water, a liquid conduit having an inlet and an outlet, said inlet communicating with the water in said tank, an electrically heated constantly operating heater for heating the water in said conduit, a water feed pump on said conduit for pumping the water toward said outlet, said pump being actuatable by an electromechanical driving means, means at said outlet for alternately supporting a coffee filter holder and a steam collection assembly, said driving means of the pump and said heater being operatively connected with an electric current supply for operation of said pump at a first rate of pumping frequency and said heater at a first level of temperature for the production of hot water at a first operating condition, control means for establishing a second rate of pumping frequency at said pump less than said first rate and a second level of temperature at said heater greater than said first level for the production of steam at a second operating condition, said control means including means for switching from one said condition to another, and said steam collection assembly including means for actuating said switching means for switching between said first and second conditions upon insertion of said steam collection assembly into and removal from said supporting means.

5. The coffee machine according to claim 4, wherein said switching means includes first and second switches respectively for operation of said electromechanical driving means of said pump and said heater, a switching transfer member movable into simultaneous engagement with said switches by said actuating means upon insertion of said steam collection assembly into said supporting means for simultaneous actuation of said switches, said control means including an electric switching arrangement series connected with the electric current supply and with said driving means of the pump in said second operating condition, said driving means of the pump being series connected only with said supply in said first operating condition, said electric switching arrangement including a timing pulse generator for changing said pump frequencies between said rates upon actuation of said first switch, and said heater being series connected via said second switch with the electric supply, said temperature being changed between said levels upons actuation of said second switch.

6. The coffee machine according to claim 5, wherein said steam collection assembly includes an open cup-shaped element, a steam tube extending from said element, and said actuating means comprising a control cam extending outwardly from said element, said control cam bearing against said transfer member upon the insertion of said assembly for shifting said transfer member into simultaneous engagement with said switches.

7. The coffee machine according to claim 5, wherein said pump operates at about 3000 strokes per minute which corresponds with the frequency of 50 Hz of the electric current supply with which it is connected in said first operating condition, and said electric switching arrangement being capable of reducing operation of said pump to about 100 strokes per minute in said second operating condition.

* * * * *